United States Patent
Harrison et al.

(10) Patent No.: US 7,014,348 B1
(45) Date of Patent: Mar. 21, 2006

(54) DECORATIVE LIGHTING DEVICE

(76) Inventors: Barbara Harrison, 11350 Foothill Blvd., #36, Lakeview Ter., CA (US) 91342; Orland L. Harrison, Jr., 11350 Foothill Blvd., #36, Lakeview Ter., CA (US) 91342

(*) Notice: Subject to any disclaimer, the term of this patent is extended or adjusted under 35 U.S.C. 154(b) by 16 days.

(21) Appl. No.: 10/237,280

(22) Filed: Sep. 9, 2002

Related U.S. Application Data

(60) Provisional application No. 60/358,802, filed on May 2, 2002.

(51) Int. Cl.
*A47G 35/00* (2006.01)
*G02B 6/00* (2006.01)

(52) U.S. Cl. .............. 362/565; 362/551; 362/806
(58) Field of Classification Search ......... 362/551, 362/554, 556, 565, 566, 567, 581, 806, 568, 362/808; 385/901
See application file for complete search history.

(56) References Cited

U.S. PATENT DOCUMENTS

| | | | | |
|---|---|---|---|---|
| 4,068,118 A | * | 1/1978 | Carrington | 362/123 |
| 4,415,953 A | * | 11/1983 | Shepherd | 362/567 |
| 4,704,660 A | * | 11/1987 | Robbins | 362/552 |
| 5,702,170 A | * | 12/1997 | Broderick | 362/568 |
| 6,113,252 A | * | 9/2000 | Arlitt et al. | 362/365 |
| 6,363,215 B1 | * | 3/2002 | Cafaro | 392/384 |
| 6,431,740 B1 | * | 8/2002 | Puleo | 362/568 |
| 6,458,435 B1 | * | 10/2002 | Lai | 362/123 |

* cited by examiner

*Primary Examiner*—John Anthony Ward
*Assistant Examiner*—Bao Q Troung
(74) *Attorney, Agent, or Firm*—Robert M. Sperry

(57) ABSTRACT

An improved decorative lighting device comprising a central column containing at least one light source, a rigid member lying in a plane substantially perpendicular to the axis of said column, and a plurality of optical fibers extending from a point adjacent the top of said column about said rigid member to a point adjacent the bottom of said column.

22 Claims, 5 Drawing Sheets

DECORATIVE LIGHTING DEVICE

RELATED CASES

This invention is described in my Provisional Patent Application, Ser. No. 60/358,802, filed May 2, 2002, and now abandoned.

FIELD OF INVENTION

This invention relates to electrical lighting and is particularly directed to improved lighting devices for providing decorative and attractive patterns.

PRIOR ART

The world is constantly seeking new and different devices which are esthetically pleasing and which provide calming, relaxing and meditatively stimulating experiences. Over the years, numerous such devices have been popular for some period of time and which have subsequently been replaced by newer such devices. Lava lights, fiber optic spray lamps, etc. are examples of such decorative lights. However, there is a constant search for new and different devices and none of the prior art devices have been entirely satisfactory.

BRIEF SUMMARY AND OBJECTS OF INVENTION

These disadvantages of the prior art are overcome with the present invention and an improved decorative lighting device is provide which can be formed in a plurality of ways to provide a multiplicity of decorative and esthetically pleasing patterns.

These advantages of the present invention are preferably attained by providing an improved decorative lighting device comprising a central column containing at least one light source, a rigid member lying in a plane substantially perpendicular to the axis of said column, and a plurality of optical fibers extending from a point adjacent the top of said column about said rigid member to a point adjacent the bottom of said column.

Accordingly, it is an object of the present invention to provide an improved decorative lighting device.

Another object of the present invention is to provide an improved decorative lighting device which can be formed in a plurality of ways.

An additional object of the present invention is to provide an improved decorative lighting device which can provide a multiplicity of decorative and esthetically pleasing patterns.

A specific object of the present invention is to provide an improved decorative lighting device comprising a central column containing at least one light source, a rigid member lying in a plane substantially perpendicular to the axis of said column, and a plurality of optical fibers extending from a point adjacent the top of said column about said rigid member to a point adjacent the bottom of said column.

These and other objects and features of the present invention will be apparent from the following detailed description, taken with reference to the figures of the accompanying drawing.

DETAILED DESCRIPTION OF THE INVENTION

Figure 1:
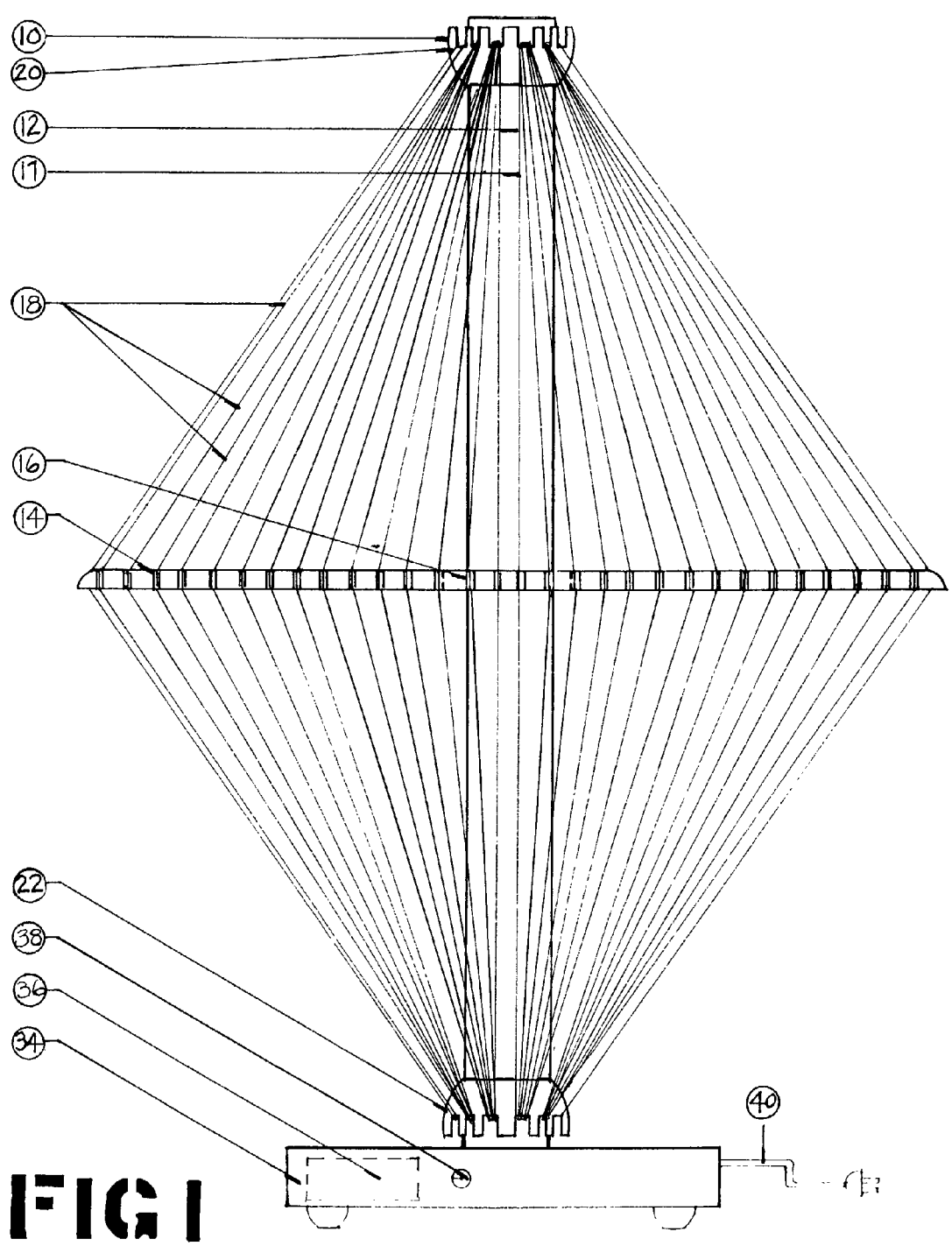
FIG. 1 is a side view of a decorative lighting device embodying the present invention.
Figure 4:
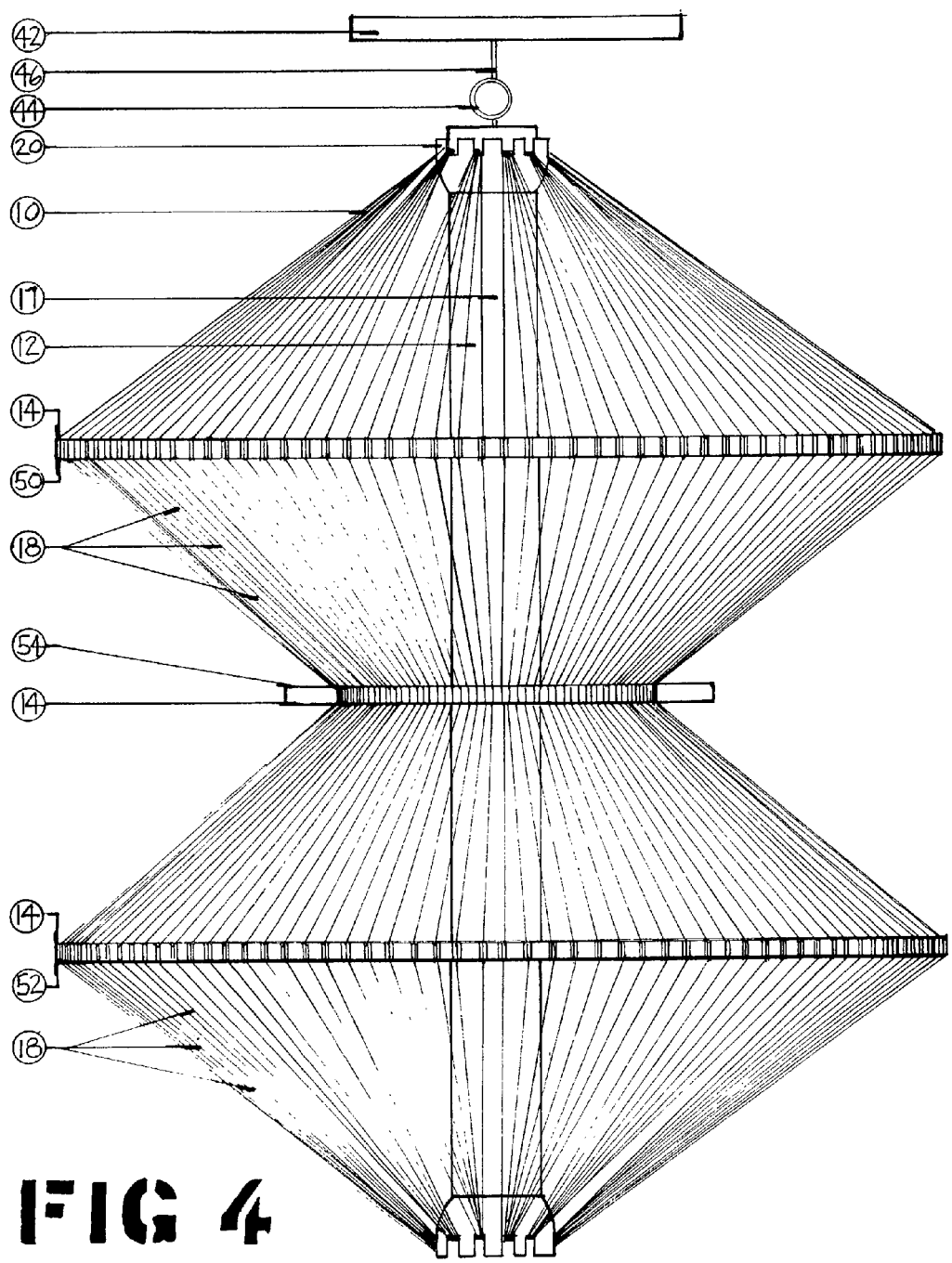
FIG. 4 is a side view of an alternative form of the lighting device of FIG. 1.

In that form of the present invention chosen for purposes of illustration, FIG. 1 shows a decorative lighting device, indicated generally at 10, having a central column 12. The column 12 is preferably formed of thin material, of less than about 1/16th inch thickness and preferably about 22 guage, and may be formed of metal or other self-supporting material. As seen in FIG. 1, the column 12 is circular in cross section and may be opaque or translucent and is perforated as seen at 17, preferably in a lincane pattern. This allows light to pass through the perforations, yet prevents undesired banding shadows. However, it should be clearly understood that the central column 12 is hollow and may have substantially any desired cross section. Thus, for example, as seen in FIG. 4, the central column 12 is rectangular in cross section. The column 12 may be used alone. Preferably, however, at least one rigid member 14 is located about the column 12 and lies in a plane substantially perpendicular to the axis of the column 12. The rigid member 14 may be transparent, translucent or opaque and may be colored and the outer edges of the rigid member may be beveled, curved as in a half bullnose or otherwise contoured. Also, the rigid member 14 has a central opening 16 having a lateral dimension greater than that of the column 12. The rigid member 14 may be a plane, undulating or otherwise shaped in cross section and the opening 16 may be dimensioned so as to allow the rigid member 14 to have a friction fit about the column 12. Alternatively, the opening 16 may be so large that the rigid member 14 is merely a band disposed about the column 12. Again, if desired, the opening 16 may have any dimension between these two extremes. A plurality of fibers 18 each have one end connected to the column 12 adjacent the upper end 20 thereof and extend about the rigid member 14 and connect to the column 12 adjacent the lower end 22 thereof. The fibers 18 may be flexible or rigid and may be formed of transparent, translucent or opaque material and may be colored. The fibers 18 may be illuminated externally, by light passing out of the perforations 17, or may be illuminated internally, by light passing through the perforations 17 to which the fibers 18 are attached and travelling through the fibers 18. One suitable material for the fibers 18 is monofilament nylon, such as is used for fishing line. Also, the fibers 18 may be connected to the rigid member 14 or may extend about the rigid member 14 with sufficient tension to retain the rigid member 14 in the desired location. Finally, at least one high intensity light source 24, such as a Halogen bulb, is mounted withing the column 12 adjacent one end thereof. Preferably, the light source 24 is located adjacent the lower end 22 of the column 12, however, if desired, the light source 24 could be located adjacent the upper end 20 of the column or, if desired, light sources 24 could be provided adjacent each end 20 and 22 of the column 12.

Figure 2:
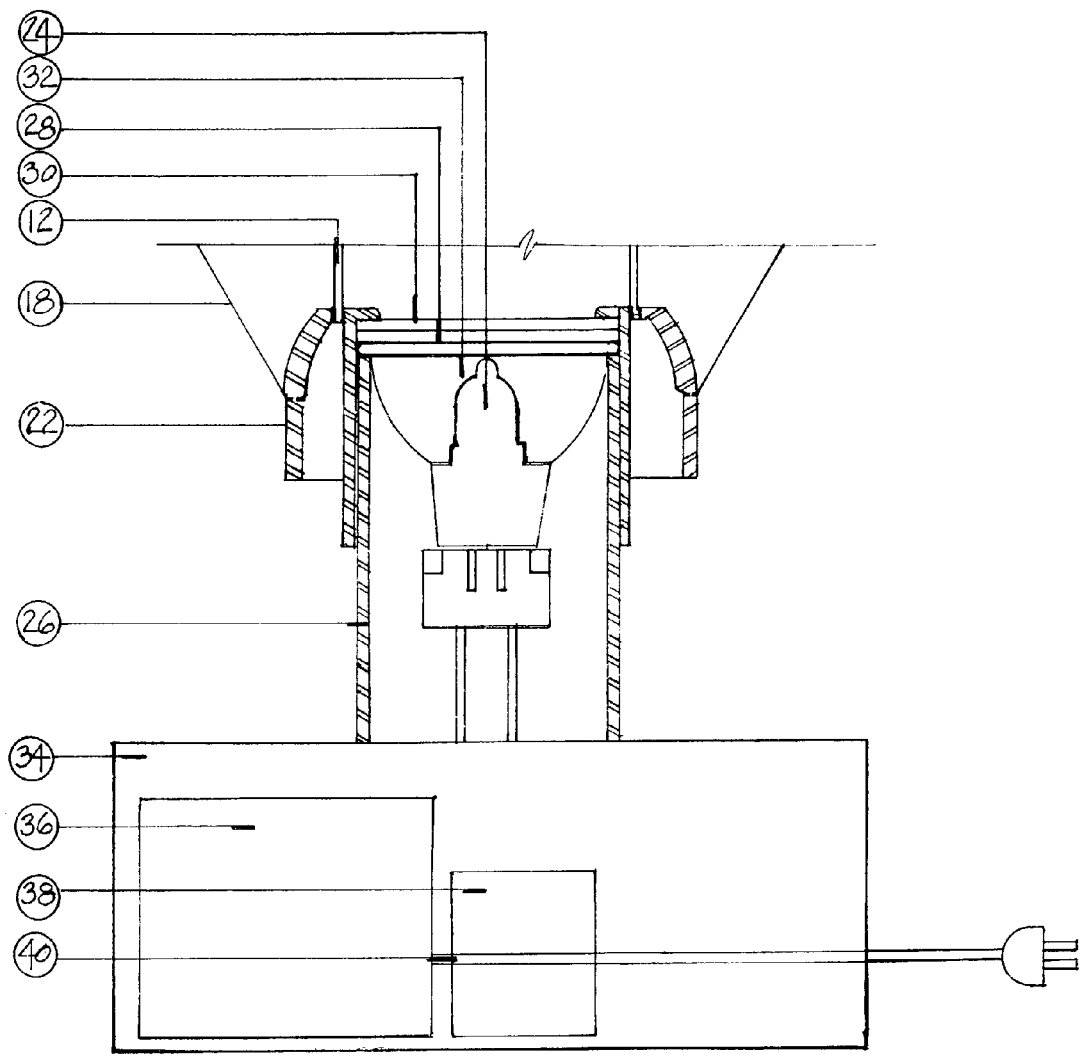
FIG. 2 is a vertical section through the lower portion of the lighting device of FIG. 1.

As seen in FIG. 2, the light source 24 is preferably mounted in a small column 26 having a friction fit within the lower end 22 of the column 12. If desired, light altering means 28, such as color filters or the like, may be provided adjacent the light source 24, as seen in FIG. 2. In addition, if desired, a louvered cylinder 30 may be provided about the light source 24 to prevent the user from directly viewing the light source 24 and suffering possible injury to their eyes. Also, if desired, reflective means 32 may be mounted below the light source 24 to reflect the light upward through the column 12 and fibers 18. The light source 24 should be a narrow spot light having a beam angle of less than 30° and preferably not more than 10°. The desired effect is that of a column of soft light. At angles between 10° and 30°, light from source 24 will shine through the perforations 17 of the column 12 and will illuminate the optical fibers 19 and to shine on the surface of the rigid member 14. At angles of 10°, the light will be confined within the column 12, yet will shine through the perforations 17 to illuminate the optical fibers 18 and to shine through the rigid member 14. At angles greater than 30°, the light will be scattered and will fail to properly illuminate the column 12. Also, the interior of the column 12 must not be coated or other wise finished, as this destroys the desired effect. The column 12 may be mounted on a base 34 which may contain suitable control means, such a transformer 36 or dimmer 38 and having a cord 40 to connect the lighting device 10 to a suitable power supply, such as a wall outlet, not shown.

Figure 3:
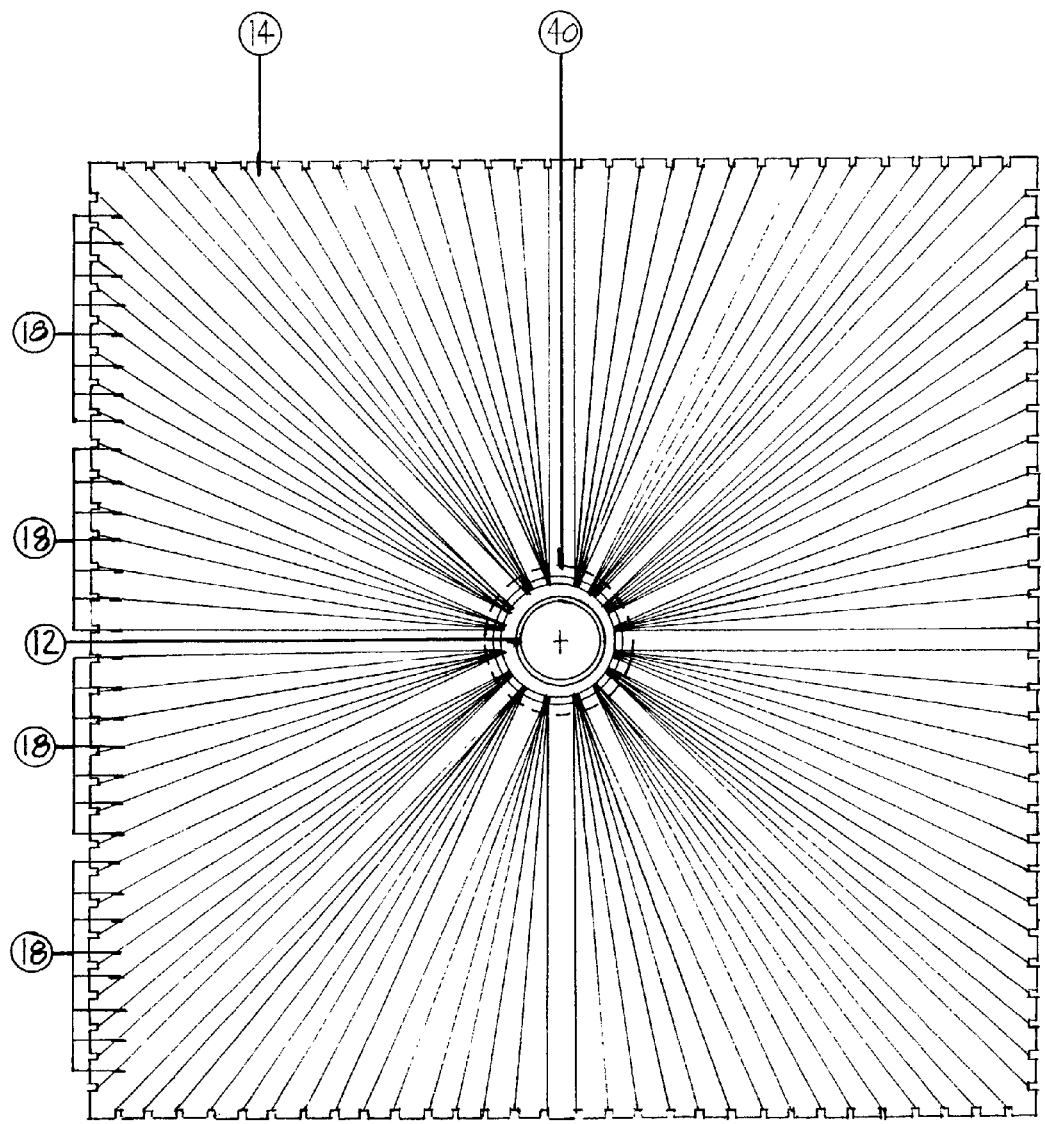
FIG. 3 is a plan view of the lighting device of FIG. 1.
Figure 5:
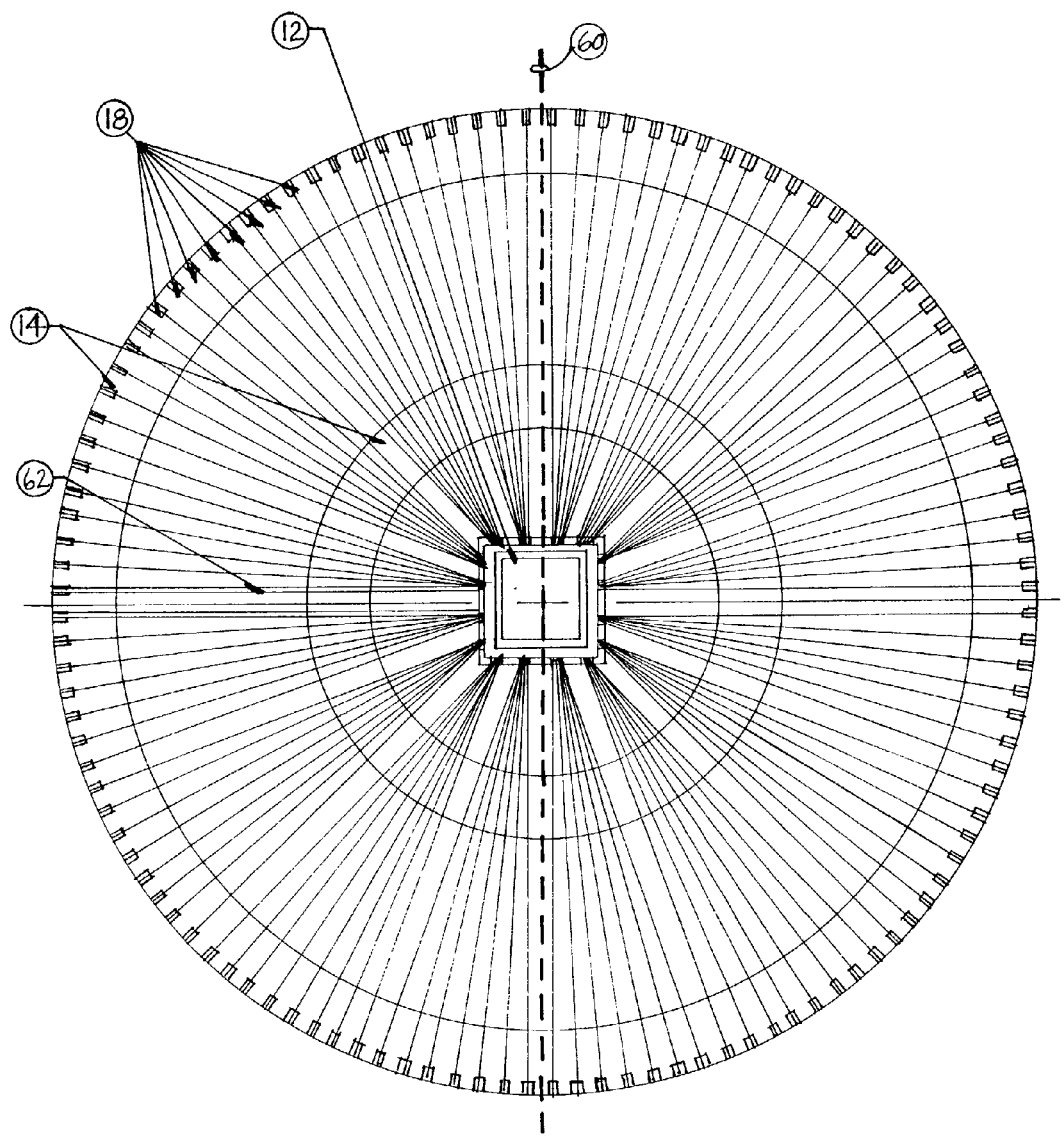
FIG. 5 is a plan view of the lighting device of FIG. 3.

In use, when the lighting device 10 is plugged in and turned on, light from light source 24 beams upward within the column 12 and out through perforations 17, thereby illuminating the fibers 18 and the rigid member 14, providing a soothing and pleasing pattern. Also, shadows caused by the fibers 18 will be seen on the ceiling and walls of the room, adding to the effect of the lighting device 10 itself. If desired, spaces may be left between some of the fibers 18 to facilitate cleaning of the column 12. As best seen in FIG. 3, the fibers 18 are connected to the upper and lower ends 20 and 22 of the column 12 which has a friction fit about the small column 26. The light source 24 is mounted in the small column 26, together with suitable light altering means 28, such as filters, color plates and the like. The louvered shield 30 serves to prevent the user from seeing directly into the light source 24 to prevent possible eye injury. As noted above, the rigid member 14 has a central opening 16 which may frictionally engage the column 12 or may be of substantially any greater dimension, as indicated by dotted line 40 in FIG. 3 or as seen in FIGS. 4 and 5. The rigis member 14 is maintained in place by the tension on the fibers 18, which may be connected to the rigid member 14 or may pass through suitable slots or hole adjacent the outer periphery of the rigid member.

FIGS. 4 and 5 show an alternative form of the lighting device 10 which is intended to be hung from an overhanging surface 42, such as a ceiling or the like, by suitable means, such as ring 44 and hook 46. In this form of the invention, the controls are mounted in the base 34 and an electrical cord 48 serves to deliver electrical energy from the base 34 to the lighting device 10. In this form of the invention, a plurality of annular rigid members 14 are provided at spaced intervals along the length of the column 12 and are maintained in place by the fibers 18 which are either connected to the rigid members 18 or pass about the outside of the upper and lower rigid members 50 and 52 and inside of the middle rigid member 54. Also, if desired, the lighting device 10 can be made for mounting on a wall, such as a sconce, by dividing the lighting device 10 in half along the dashed line 60. When this is done, it will be necessary to provide at least one spacer member, as seen at 62, to maintain the rigid members 14 at the desired distance from the column 12.

Obviously, numerous other variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. A lighting device comprising:
    a central column containing at least one light source positioned to shine axially within said column,
    at least one rigid member lying in a plane substantially perpendicular to the axis of said column, and
    a plurality of fibers extending from a point adjacent the top of said column out to said at least one rigid member and then a point adjacent the bottom of said column, said fibers serving to maintain said at least one rigid member in a desired position.

2. The lighting device of claim 1 wherein:
said at least one light source is a high intensity light source.

3. The lighting device of claim 1 wherein:
said at least one light source is a halogen bulb.

4. The lighting device of claim 1 wherein:
said fibers are rigid.

5. The lighting device of claim 1 wherein:
said fibers are connected to said rigid member.

6. The lighting device of claim 1 wherein:
said plurality of fibers are in tension and said tension serves to maintain said at least one rigid member in a desired position.

7. The lighting device of claim 1 wherein:
said column is perforated.

8. The lighting device of claim 1 wherein:
said column is perforated along substantially the entire length said column.

9. The lighting device of claim 1 wherein:
said lighting device has a base with a small column projecting from one surface thereof, and
said central column has a friction fit about said small column.

10. The lighting device of claim 1 wherein:
said rigid member is a planar member having a central opening encircling said column.

11. The lighting device of claim 10 wherein:
said central opening has a friction fit about said column.

12. The lighting device of claim 10 wherein:
said central opening has a lateral dimension greater than that of said column.

13. The lighting device of claim 1 wherein:
said at least one rigid member is annular.

14. The lighting device of claim 1 wherein:
said rigid members are positioned at spaced locations along the length of said column.

15. The lighting device of claim 1 wherein:
said lighting device has a means located adjacent one end of said column to enable said lighting device to be hung from an overhanging surface.

16. The lighting device of claim 1 wherein:
said column is formed of metal of less than $\frac{1}{16}$ inch thickness.

17. The lighting device of claim 1 wherein:
said column is formed of 22 gauge thickness material.

18. The lighting device of claim 1 wherein:
said fibers are formed of transparent material.

19. The lighting device of claim 1 wherein:
said fibers are formed of translucent material.

20. The lighting device of claim 1 wherein:
said fibers are formed of opaque material.

21. The lighting device of claim 1 wherein:
said fibers are formed of monofilament nylon.

22. The lighting device of claim 1 wherein:
said fibers are flexible.

* * * * *